US008270806B2

(12) United States Patent
Yashiro et al.

(10) Patent No.: US 8,270,806 B2
(45) Date of Patent: Sep. 18, 2012

(54) INFORMATION PROCESSING APPARATUS AND METHOD OF CONTROLLING SAME

(75) Inventors: Satoshi Yashiro, Yokohama (JP); Hiroshi Tojo, Fuchu (JP); Hidetomo Sohma, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 265 days.

(21) Appl. No.: 12/604,058

(22) Filed: Oct. 22, 2009

(65) Prior Publication Data
US 2010/0104266 A1    Apr. 29, 2010

(30) Foreign Application Priority Data
Oct. 29, 2008    (JP) .................................. 2008-278607

(51) Int. Cl.
*H04N 9/80* (2006.01)

(52) U.S. Cl. ........ 386/241; 386/239; 386/326; 386/353; 348/700

(58) Field of Classification Search ................. 386/239, 386/241, 326, 353; 348/700; 382/118
See application file for complete search history.

(56) References Cited

U.S. PATENT DOCUMENTS

| 6,728,473 | B1 * | 4/2004 | Chotoku et al. ............. 386/241 |
| 6,965,701 | B2 | 11/2005 | Tojo |
| 7,038,736 | B2 | 5/2006 | Tojo |
| 7,051,048 | B2 | 5/2006 | Sohma et al. |
| 7,123,264 | B2 | 10/2006 | Tojo et al. |
| 7,145,684 | B2 | 12/2006 | Tojo |
| 7,155,064 | B2 | 12/2006 | Tojo |
| 7,170,935 | B2 | 1/2007 | Tojo |
| 7,269,290 | B2 | 9/2007 | Tojo |
| 7,391,436 | B2 | 6/2008 | Tojo |
| 7,466,365 | B2 | 12/2008 | Tojo |
| 2002/0114615 | A1 | 8/2002 | Tojo et al. |
| 2003/0234866 | A1 | 12/2003 | Cutler |
| 2004/0263611 | A1 | 12/2004 | Cutler |
| 2005/0046703 | A1 | 3/2005 | Cutler |
| 2005/0117015 | A1 | 6/2005 | Cutler |

(Continued)

FOREIGN PATENT DOCUMENTS
JP         10224736 A      8/1998
(Continued)

OTHER PUBLICATIONS

Rowley et al, "Neural network-based face detection", IEEE Transactions on Pattern Analysis and Maching Intelligence, vol. 20, No. 1, Jan. 1998.

(Continued)

*Primary Examiner* — Thai Tran
*Assistant Examiner* — Mishawn Dunn
(74) *Attorney, Agent, or Firm* — Fitzpatrick, Cella, Harper & Scinto

(57) ABSTRACT

An information processing apparatus for extracting a more appropriate representative frame image from moving image data that includes a plurality of frames of image data arranged in a time series includes: an input unit configured to input moving image data; a detecting unit configured to detect a frame image, which includes an image similar to a prescribed image pattern; a tracking unit configured to detect a frame image, which includes an image similar to the image included in the detected frame image; a storage unit configured to store successive frame images that have been detected by the tracking unit; a splitting unit configured to split the moving image data into a plurality of time intervals; and an extracting unit configured to extract a representative frame image using different evaluation rules.

6 Claims, 9 Drawing Sheets

U.S. PATENT DOCUMENTS

| | | |
|---|---|---|
| 2005/0117034 A1 | 6/2005 | Cutler |
| 2005/0151837 A1 | 7/2005 | Cutler |
| 2005/0285943 A1 | 12/2005 | Cutler |
| 2006/0023074 A1 | 2/2006 | Cutler |
| 2006/0023075 A1 | 2/2006 | Cutler |
| 2006/0083443 A1 | 4/2006 | Tojo |
| 2006/0122986 A1 | 6/2006 | Sohma |
| 2006/0132853 A1 | 6/2006 | Tojo |
| 2006/0268131 A1 | 11/2006 | Cutler |
| 2007/0024710 A1 | 2/2007 | Nakamura |
| 2007/0285579 A1* | 12/2007 | Hirai et al. .............. 348/700 |
| 2008/0144890 A1* | 6/2008 | Ogawa .................. 382/118 |
| 2008/0231757 A1 | 9/2008 | Tojo |
| 2008/0247675 A1 | 10/2008 | Magai et al. |
| 2008/0285855 A1 | 11/2008 | Shiiyama et al. |
| 2008/0304753 A1 | 12/2008 | Sohma et al. |

FOREIGN PATENT DOCUMENTS

| | | |
|---|---|---|
| JP | 2001167110 A | 6/2001 |
| JP | 3312105 B2 | 8/2002 |
| JP | 2002223412 A | 8/2002 |
| JP | 2005101906 A | 4/2005 |
| JP | 2006129480 A | 5/2006 |

OTHER PUBLICATIONS

Yang et al, "Detecting Faces in Images: A Survey", IEEE Transactions on Pattern Analysis and Machine Intelligence, vol. 24, No. 1, Jan. 2002.

Turk et al, "Eigenfaces for recognition", Journal of Cognitive Neuroscience 3(1): 71-86, 1991.

U.S. Appl. No. 12/613,052, filed Nov. 5, 2009 by Hidetomo Sohma, Hiroshi Tojo and Satoshi Yashiro.

Office Action dated Jan. 26, 2012 in related U.S. Appl. No. 12/613,052.

* cited by examiner

FIG. 5

| SEQUENCE NO. | STARTING TIME | LENGTH |
|---|---|---|
| 1 | 43.50 | 2.83 |
| 2 | 55.34 | 12.58 |
| 3 | 58.35 | 14.33 |
| 4 | 96.24 | 8.73 |
| 5 | 105.13 | 6.24 |
| 6 | 119.15 | 19.52 |
| 7 | 131.45 | 2.30 |
| 8 | 158.83 | 13.5 |
| ... | ... | ... |

FIG. 6

| REPRESENTATIVE FRAME | SEQUENCE NO. | EVALUATION VALUE |
|---|---|---|
| 24.3 | --- | 0.9 |
| 44.25 | 1 | 0.5 |
| 60.38 | 2 | 0.4 |
| 60.38 | 3 | 0.8 |
| 87.53 | --- | 0.95 |
| 99.52 | 4 | 0.7 |
| 108.35 | 5 | 0.85 |
| 130.45 | 6 | 0.65 |
| 135.65 | 6 | 0.9 |
| 165.19 | 8 | 0.5 |
| ... | ... | ... |

INFORMATION PROCESSING APPARATUS AND METHOD OF CONTROLLING SAME

BACKGROUND OF THE INVENTION

1. Field of the Invention

The present invention relates to a technique for extracting a representative frame, which straightforwardly represents video contained in moving image data, from the moving image data.

2. Description of the Related Art

The widespread use of digital cameras and digital video camcorders, or the like, in recent years has made it possible for large quantities of moving images to be captured even by individuals. Since video data generally involves an enormous amount of data, the user of such video data fast-forwards or fast-rewinds video if the user wishes to ascertain an overview of content or searches for a desired scene. Accordingly, in order to ascertain the content of a moving image in a short period of time, a representative frame extraction technique has been proposed for selecting and presenting a frame that well represents the content of a moving image.

For example, the specification of Japanese Patent Laid-Open No. 2002-223412 (Patent Document 1) discloses a technique in which a series of images obtained by uninterrupted shooting using a single camera is adopted as one series of shots and a key frame is selected from the series of shots based upon a moment of playback time, such as the beginning, end or middle of the shot. It is arranged so that a plurality of shots are connected together as a single scene based upon similarity of the key frames and a prescribed number of key frames are selected from each scene. Further, in order that a frame containing a person who appears in the frame will be selected as a key frame, it is arranged so that a frame that includes a face region is selected preferentially.

The specification of Japanese Patent Laid-Open No. 2005-101906 (Patent Document 2) discloses a technique in which, if the makeup of persons that appear in a moving image has changed, the scenes of the moving picture are split, an index indicating the makeup of the persons is assigned to each scene and the scenes are searched. Furthermore, the specification of Japanese Patent Laid-Open No. 2001-167110 (Patent Document 3) discloses a technique for performing detection tailored to a face. Specifically, the faces of persons that appear in video are distinguished by identifying detected faces and a representative frame is selected based upon face orientation, size, number of faces, and the like in an interval in which a face has been detected.

Furthermore, the specification of Japanese Patent No. 3312105 (Patent Document 4) discloses a representative frame extraction technique that is based upon the statistical features of an object. Specifically, the image of an object desired to be detected is learned in advance, an evaluation value is found using a dictionary on a per-object basis by a prescribed method, and an index is generated based upon the evaluation value of each object obtained frame by frame.

However, with the technique described in Patent Document 1, even if a key frame containing a face has been selected, there are instances where a frame image is not one in a state favorable as far as the user is concerned, as when the face region is too small or is facing sideways, or the like. Further, there many instances where the target of shooting by a digital camera has a family as the subject, as when the goal is to show the growth of a child. In such cases, the techniques described in Patent Documents 2 and 3 for extracting a representative frame by using a person as the object of interest are such that only representative frames in which the faces of the family appear are lined up. In other words, since representative frames are selected by focusing upon a moving image interval in which persons and faces could be detected, frames that includes scenery or subjects that leave an impression in which persons and faces could not be detected are not selected as representative frames. Furthermore, with the technique described in Patent Document 4, an evaluation value is obtained on a per-frame basis. Consequently, in a case where the purpose is to ascertain the content of video in home video, a large number of similar frames become indices that are redundant.

In other words, if a representative frame is selected by taking a specific subject (a face, for example) as the object of interest, "who" appears in the image can be ascertained but information as to "where" the image was shot is missing. Consequently, a problem which arises is that in content such as personal content that has been shot as with a home video camera, a suitable representative frame cannot necessarily be extracted.

SUMMARY OF THE INVENTION

According to one aspect of the present invention, an information processing apparatus comprises: an input unit configured to input moving image data that includes a plurality of frame images arranged in a time series; a detecting unit configured to detect a frame image, which includes an image similar to a prescribed image pattern, from moving image data that has been input; a tracking unit configured to detect a frame image, which includes an image similar to the image included in the frame image detected by the detecting unit, detection being performed by adopting frame images before and after the detected frame image as a target; a storage unit configured to store, as an image sequence, successive frame images that have been detected by the tracking unit, the successive images being stored in association with time information in the moving image data corresponding to the image sequence; a splitting unit configured to split the moving image data into a plurality of time intervals based upon whether one or more image sequences have been stored in the storage unit at each time in the moving image data; and an extracting unit configured to extract, from each of the plurality of time intervals, a representative frame image using different evaluation rules depending upon whether the interval includes one or more image sequences which have been stored in the storage unit at each time in the moving image data.

According to another aspect of the present invention, a method of controlling an information processing apparatus for extracting one or more representative frame images from moving image data that includes a plurality of frame images arranged in a time series, the method comprises: an input step of inputting moving image data; a detecting step of detecting a frame image, which includes an image similar to a prescribed image pattern, from moving image data that has been input; a tracking step of detecting a frame image, which includes an image similar to the image included in the frame image detected at the detecting step, detection being performed adopting frame images before and after the detected frame image as a target; a storage step of storing, as an image sequence, successive frame images that have been detected at the tracking step, the successive images being stored in a storage unit in association with time information in the moving image data corresponding to the image sequence; a splitting step of splitting the moving image data into a plurality of time intervals based upon whether one or more image sequences have been stored in the storage unit at each time in the moving image data; and an extracting step of extracting, from each of the plurality of time intervals, a representative frame image using different evaluation rules depending upon whether the interval includes one or more image sequences which have been stored in the storage unit at each time in the moving image data.

The present invention provides a technique that makes it possible to extract a representative frame image, which expresses the content of moving image data more appropriately, from the moving image data.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 is a diagram illustrating an example of data obtained by recording information concerning face sequences;

FIG. 6 is a diagram illustrating an example of data obtained by outputting position information of representative frame images;

DESCRIPTION OF THE EMBODIMENTS

Preferred embodiments of the present invention will now be described in detail with reference to the drawings. It should be noted that the embodiments below are merely for illustrative purposes and do not constitute gist that limits the scope of the invention.

First Embodiment

<Overview>

In a first embodiment, a method is described in which a face image is searched for and retrieved from moving image data and an evaluation rule (standard) of a representative frame image in an information processing apparatus is changed based upon whether a time interval is one that includes a face image. As a result, an image of a person is selected as a representative frame image from a time interval that includes a face image, and a scenery image is selected as a representative frame image from a time interval that does not include a face image.

<Apparatus Configuration>

Figure 1:
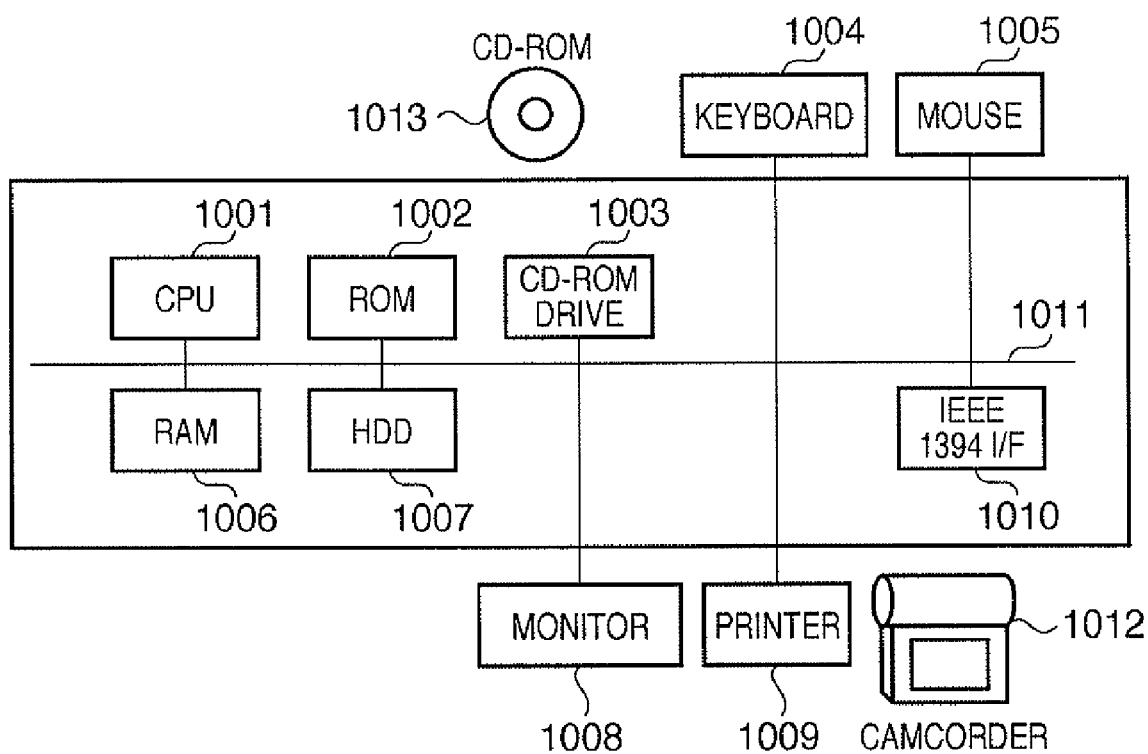
FIG. 1 is a diagram illustrating the internal configuration of an information processing apparatus according to a first embodiment of the present invention.

FIG. 1 is a diagram illustrating the internal configuration of an information processing apparatus according to a first embodiment of the present invention.

The information processing apparatus includes a CPU 1001, a ROM 1002, a CD-ROM drive 1003, a RAM 1006, a hard-disk drive (HDD) 1007 and an IEEE-1394 interface (I/F) 1010. These units are connected via a system bus 1011 so as to be capable of communicating. A keyboard 1004, a mouse 1005, a monitor 1008 and a printer 1009 are connected to the information processing apparatus as a user interface.

The CPU 1001 controls the overall operation of the information processing apparatus, reads out a processing program that has been stored beforehand in the ROM 1002, or the like, and executes the program to thereby implement functional units described later with reference to FIG. 2. The ROM 1002 stores a program, or the like, which, by being executed by the CPU 1001, performs control operations described later. The RAM 1006 stores temporary data such as face sequence information described later. The CD-ROM drive 1003 reads a control program, which has been stored on a CD-ROM 1013, and can store this control program in the RAM 1006. Moving image data that has been read from a camcorder 1012 is stored on the hard-disk drive 1007 via the IEEE-1394 interface 1010.

In the description that follows, it is assumed that the information processing apparatus and camcorder 1012 are connected via the IEEE-1394 interface 1010 and are capable of communicating with each other.

Figure 2:
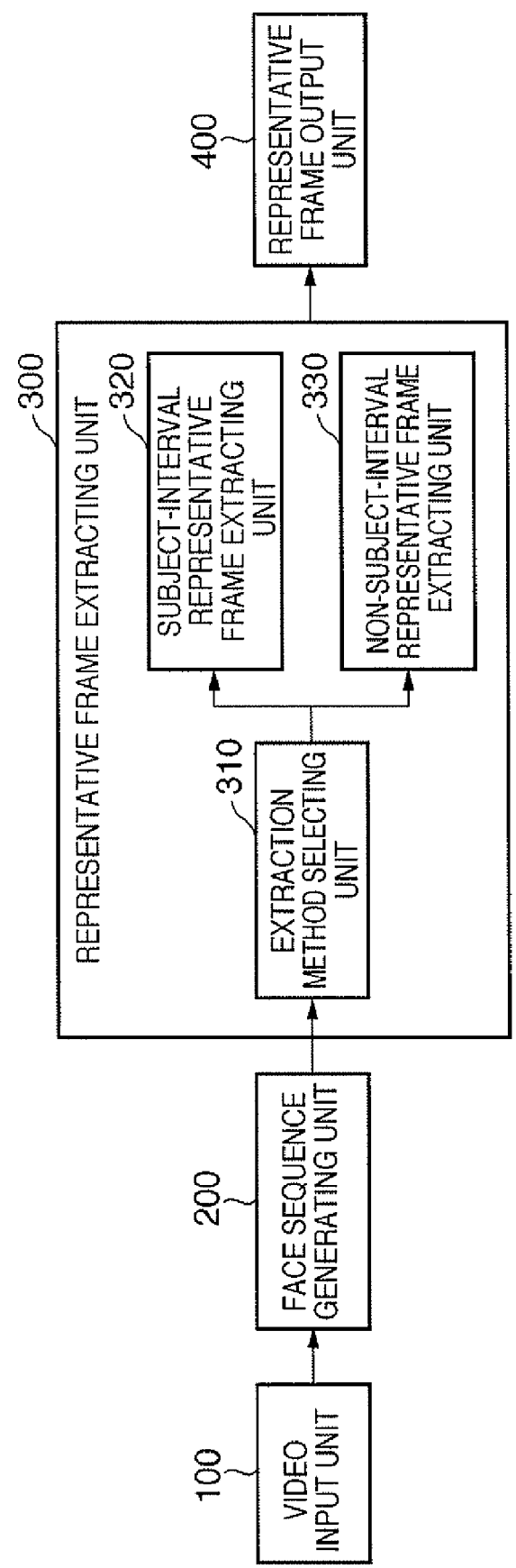
FIG. 2 is a functional block diagram of the information processing apparatus according to the first embodiment.
Figure 3:
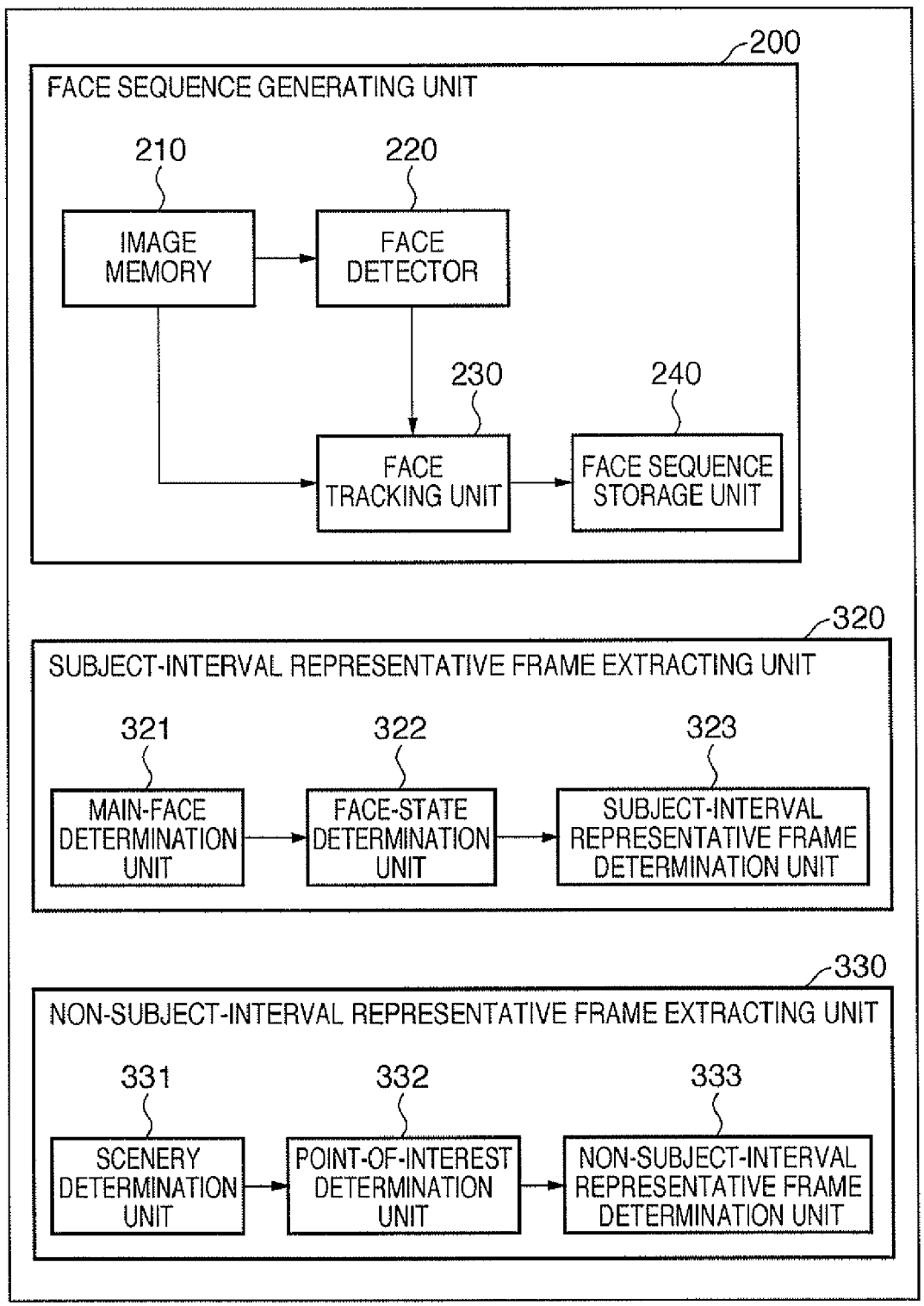
FIG. 3 is a diagram illustrating detailed functional blocks within functional units.

FIG. 2 is a functional block diagram of the information processing apparatus according to the first embodiment. FIG. 3 is a diagram illustrating detailed functional blocks within functional units. The operation of each unit will be described in detail.

A video input unit 100 inputs moving image data from the camcorder 1012 via the IEEE-1394 interface 1010. If the video input unit 100 is capable of reading in moving image data, it can just as well be any interface device. It should be noted that the moving image data includes a plurality of frame images arranged in a time series.

A face sequence generating unit 200 analyzes input video, extracts a face image from each of the frames in a video interval in which the face appears and outputs a face sequence. Here a "face sequence" refers to face images that have been extracted from a continuous video interval and a collection of auxiliary information thereof. Examples of the auxiliary information are the time position of a frame in which a face image was extracted and the region from which the face was cut in the frame, or the like.

The face sequence generating unit 200 is comprised of an image memory 210, a face detector 220, a face tracking unit 230 and a face sequence storage unit 240. The image memory 210 stores moving image data, which has been output from the video input unit 100, in the RAM 1006 temporarily frame by frame. The face detector 220 performs detection of a face pattern from a prescribed frame of the moving image data and outputs the result of detection. The face tracking unit 230 searches for the face pattern, which has been detected by the face detector 220, from within the succeeding frame and, based upon the result of tracking, outputs face-region information and the time interval of the face sequence.

A representative frame extracting unit 300 extracts one or a plurality of frames, which well represent the content (video) of a prescribed time interval, from this time interval. The representative frame extracting unit 300 is constituted by an extraction method selecting unit 310, a subject-interval representative frame extracting unit 320 and a non-subject-interval representative frame extracting unit 330.

The extraction method selecting unit 310 changes an evaluation rule (extraction standard) of a representative frame image based upon the output from the face sequence generating unit 200. The subject-interval representative frame extracting unit 320 extracts any number of representative frame images, which well represent the content of a person, from frame images included in a face sequence. The non-subject-interval representative frame extracting unit 330 extracts any number of representative frames, which well represent scenery or objects that leave an impression, from frame images of a time interval that do not belong to any face sequence.

A representative frame output unit 400 displays an extracted representative frame on a monitor 1008 or outputs the frame using a printer 1009, by way of example.

<Operation of Apparatus>

Figure 4:
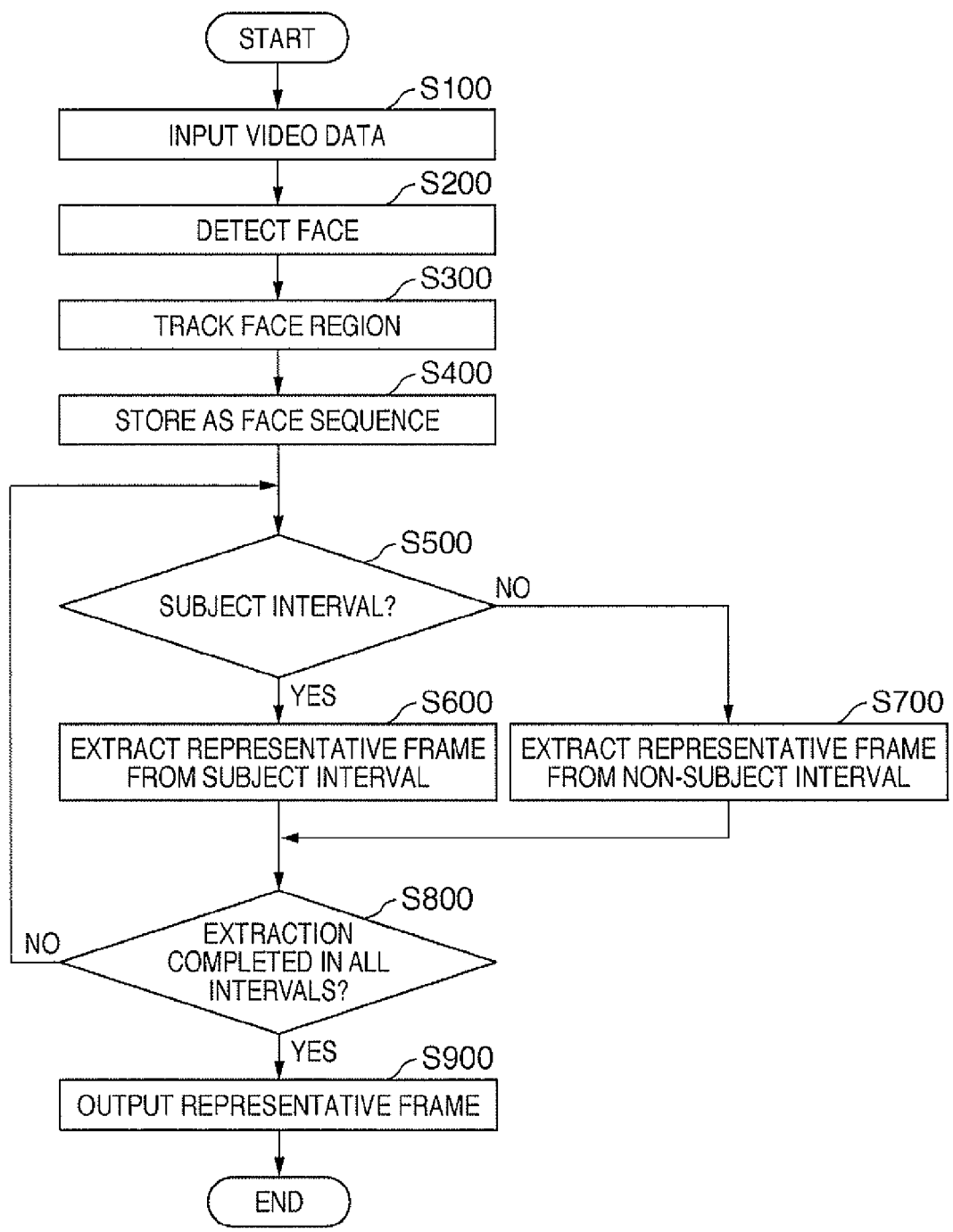
FIG. 4 is an operation flowchart of the information processing apparatus according to the first embodiment.

FIG. 4 is a flowchart illustrating operation of the information processing apparatus according to the first embodiment.

At step S100, the video input unit 100 reads desired moving image data into the image memory 210 frame by frame. The image data that has been read in is two-dimensional array data and is composed of the three colors red (R), green (G), and blue (B) each of which is composed of 8-bit pixels, by way of example. If the image data has been compressively encoded as by the MPEG or JPEG encoding scheme, then the image data is decoded in accordance with the corresponding decoding scheme and image data composed of RGB pixels is generated.

At step S200, the face detector 220 performs detection of a face pattern from a prescribed frame of the moving image data and outputs the result of detection. That is, the face detector 220 performs face detection from each frame at prescribed frame intervals of the moving image data. Here, a case where a method of detecting a face pattern in an image using a neural network proposed by Reference Document 1 is applied will be described.

First, image data that is to undergo face detection is read into memory and a prescribed region to be compared with a face is cut from the image that has been read in. With a distribution of pixel values of the extracted region serving as an input, a single output is obtained via an operation performed by a neural network. The weighting and threshold value of the neural network have been learned beforehand, based upon a large quantity of face image patterns and non-face image patterns. For example, if the output of the neural network is zero or greater, then the extracted region is determined to be a face; otherwise, it is determined not to be a face.

Figure 9:
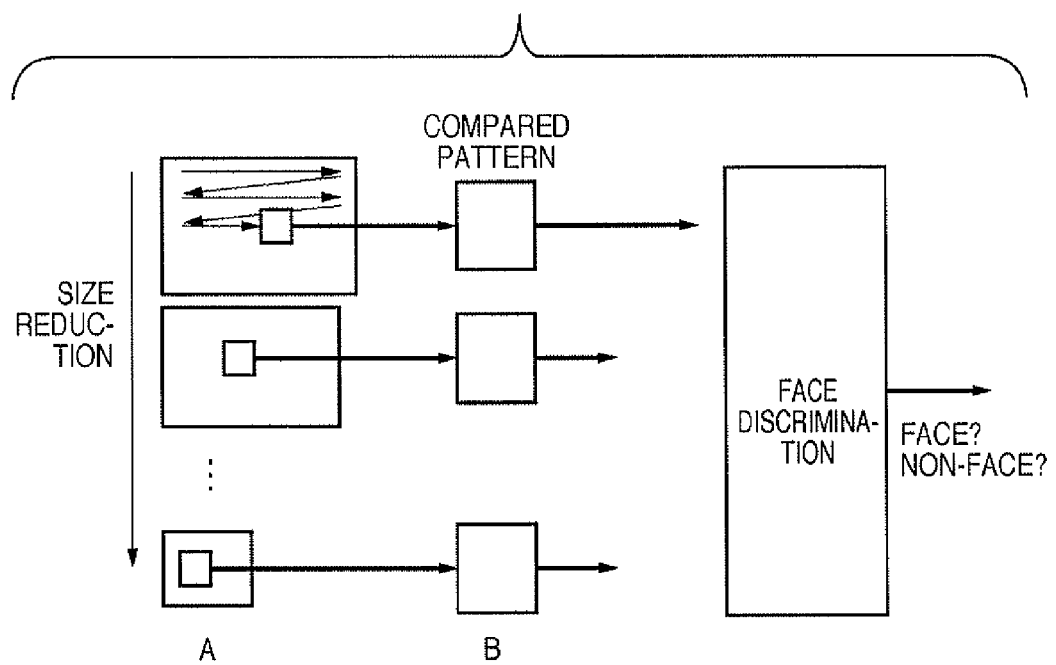
FIG. 9 is a diagram exemplifying the manner in which a face is detected from within an image by a method using a neural network.

FIG. 9 is a diagram exemplifying the manner in which a face is detected from within an image by a method using a neural network. In particular, FIG. 9 illustrates the manner in which the cutting position of an image pattern compared with a face, which is the input of the neural network, is scanned sequentially vertically and horizontally across the full image. In order to deal with detection of faces of various sizes, it is ideal to adopt an arrangement in which the image that has been read in is reduced in size successively at a prescribed ratio, as illustrated in FIG. 9, and the above-mentioned scanning for face detection is performed with regard to each reduced image.

It should be noted that the method of detecting a face from an image is not limited to the method using the neural network described above. For example, it is possible to apply the various schemes mentioned in Reference Document 2.

Reference Document 1: Rowley et al, "Neural network-based face detection", IEEE TRANSACTIONS ON PATTERN ANALYSIS AND MACHINE INTELLIGENCE, VOL. 20, NO. 1, JANUARY 1998

Reference Document 2: Yang et al, "Detecting Faces in Images: A Survey", IEEE TRANSACTIONS ON PATTERN ANALYSIS AND MACHINE INTELLIGENCE, VOL. 24, NO. 1, JANUARY 2002

At step S300, the face tracking unit 230 searches for a face pattern from succeeding frames for all face patterns detected by the face detector 220. At step S400, an interval in which a subject appears is output as a face sequence. That is, tracking is performed in succeeding frames with regard to respective ones of face images that have been detected at a prescribed frame intervals, and a collection of the successive face images is decided and output as an image sequence (face sequence). Also output at this time in associated form is auxiliary information such as time information (time position) of a frame, in which a face was extracted, in the moving image data, and information about the region in which the face image in the frame was cut.

FIG. 5 is a diagram illustrating an example of auxiliary information obtained by recording information concerning face sequences. Information regarding each face sequence detected has been recorded in this data.

The first column is a column of sequence numbers, which are indices; the second column is a column of starting times, which indicate numbers of seconds from the beginning of the moving image data; and the third column is a column of lengths, which indicate continuation times of the face sequences. It should be noted that in a case where the face detection unit can identify that a person is the same person or can identify who a person is, a person ID may also be recorded together with the above.

Figure 7:
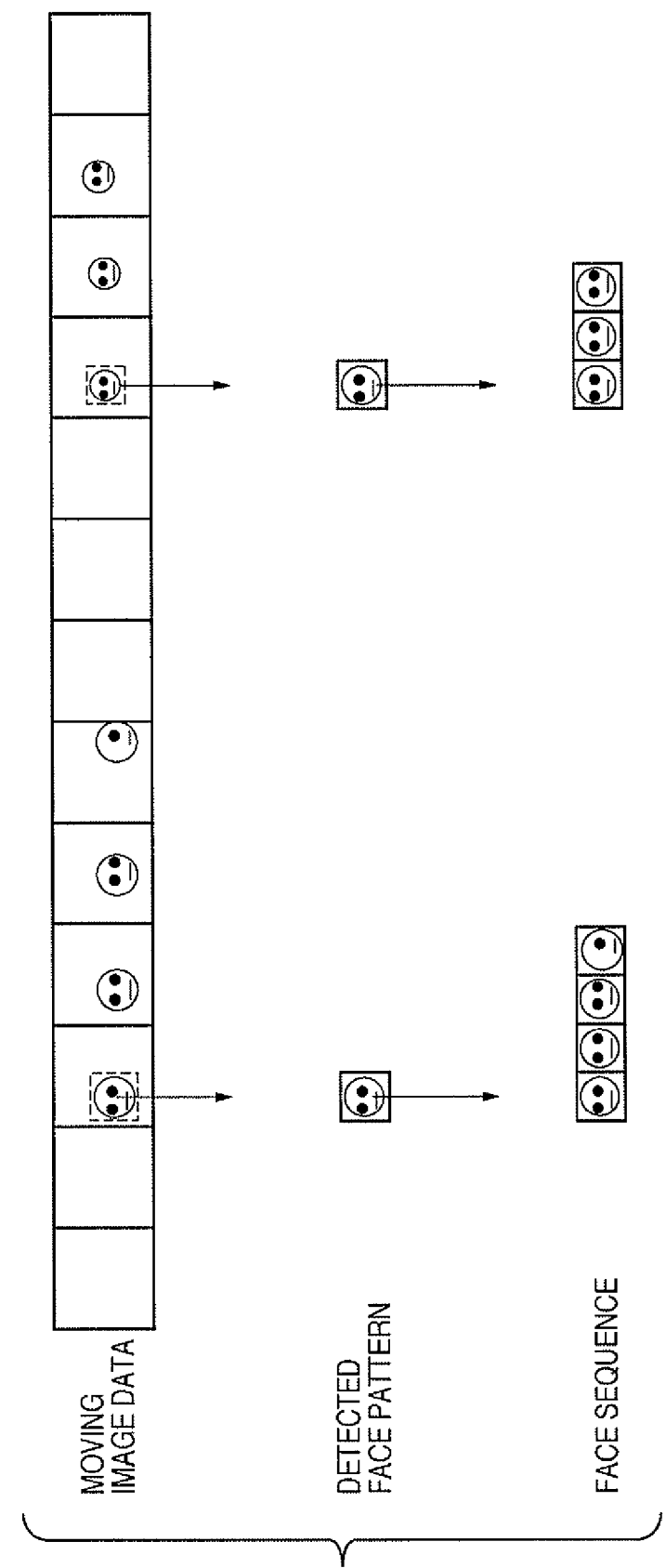
FIG. 7 is a diagram exemplifying the manner in which a face sequence is generated from moving image data.
Figure 8:
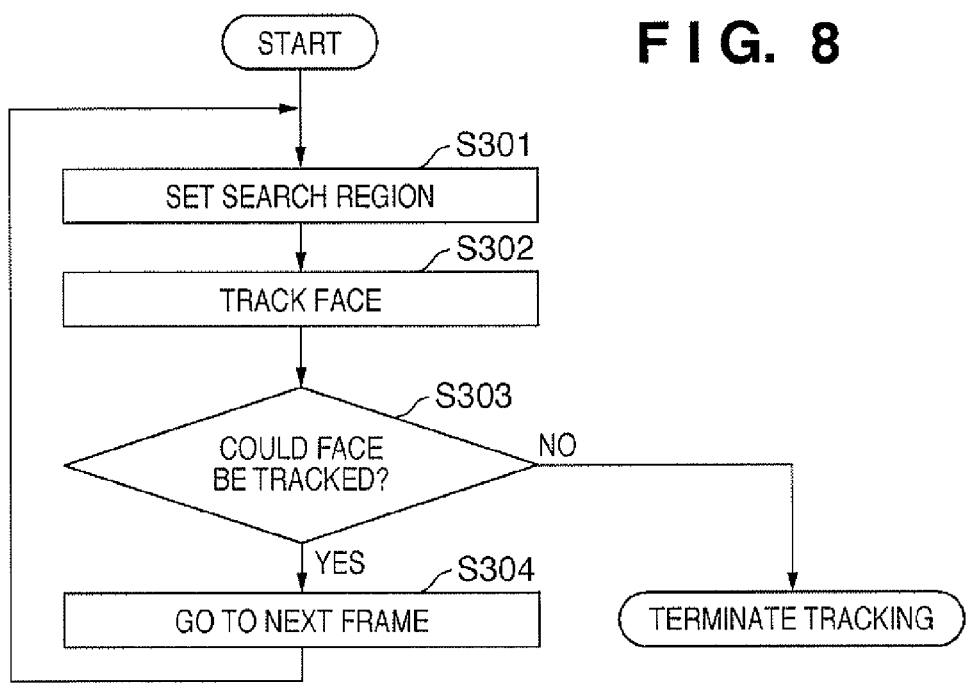
FIG. 8 is a diagram illustrating flow of processing for generating a face sequence.

FIG. 8 is a diagram illustrating flow of processing for generating a face sequence. Further, FIG. 7 is a diagram exemplifying the manner in which a face sequence is generated from moving image data. The details of face sequence generation will now be described.

At step S301, a search region for conducting a search for a face pattern in a succeeding frame is set based upon region information of the face pattern. In a case where a search is conducted from a frame that follows a frame in which a face has been detected by the face detector 220, a rectangular area obtained by shifting the center position of a face region prescribed amounts with regard to horizontal and vertical positions relative to the face region, which is the result of face detection, is adopted as a search zone. In a case where the search is conducted in a further succeeding frame, a face region, which is the result of face tracking, is utilized in a similar manner. It may be arranged so that a search is conducted targeted on a preceding frame and not just a succeeding frame.

At step S302, face tracking is performed based upon the correlation between the area cut out in the search region and the face pattern searched. That is, rectangular areas having a size the same as the face pattern searched are cut out successively centered on the center position set as the search region, and correlation values are calculated using, as a template, a luminance distribution of the cut-out area and the face pattern searched. A region having a high correlation value is output, together with the correlation value, as the face-pattern tracking result.

Although correlation values of a luminance distribution are used here in order to track a face pattern, correlation of a pixel-value distribution of each of the colors R, G, and B may be used, by way of example. Further, a correlation of image features, such as a luminance distribution within a region or a histogram of RGB values, may be used.

At step S303, it is determined whether a correlation value that has been output by face tracking processing is greater than or equal to a prescribed value. If the correlation value is greater than or equal to the prescribed value, there is a high degree of similarity and therefore it is determined that the face could be tracked accurately. Control proceeds to step S304 in such a case. If the correlation value is less than the prescribed value, then there is little similarity and therefore it is determined that the face could not be tracked. Face tracking is terminated in this case.

At step S304, the frame in which face tracking is to be performed is changed to the succeeding frame and control returns to step S301. A face sequence for every detected face is acquired by repeatedly executing the above-described processing.

It has been described above that a face pattern is searched for and tracked from a frame image that succeeds a frame image in which a face pattern has been detected by the face detector 220. However, an arrangement may be adopted in which a face pattern is searched for and tracked adopting as the target a frame image preceding a frame image in which a face pattern has been detected. In addition, an arrangement may be adopted in which a motion vector is derived from each frame image included in a moving image and tracking of a face pattern is performed based upon the motion vector derived.

In order to prevent a face sequence from being excessively split due to something passing by in front of the face or due to the effect of a flash or the like, face tracking may be carried out using frames spaced apart by a prescribed time interval. Further, a correlation of face features of two face sequences adjacent to each other in terms of time may be found and the two face sequences may be joined into a single face sequence if the correlation is high. That is, a segment from the start of the section on the front side to the end of the section on the back side is adopted as one joined section and the segments are joined along with the auxiliary information. The representative pattern may be that of one of the face sequences.

The determination of the similarity of face sequences and the joining thereof are carried out successively with regard to all mutually adjacent face sequences and similar face sequences are joined. However, a set of face sequences in which the video intervals corresponding to the face sequences exceed a prescribed length of time is not used as a candidate for joining of face sequences. Further, in a case where a plurality of persons appear in video, there are instances where video intervals overlap in a plurality of face sequences. In such a case, however, the persons corresponding to the respective face sequences are regarded as separate persons and therefore these face sequences are not used as candidates for joining of face sequences.

Extraction of Representative Frame Image

Described next will be a method of extracting a representative frame image from moving image data based upon information of one or more face sequences that have been output in step S400.

In step S500, it is determined whether each time interval included in the moving image data is an interval containing a face sequence (this interval will be referred to as a "subject interval" below) or an interval that does not contain a face sequence (this interval will be referred to as a "non-subject interval" below).

Figure 11:
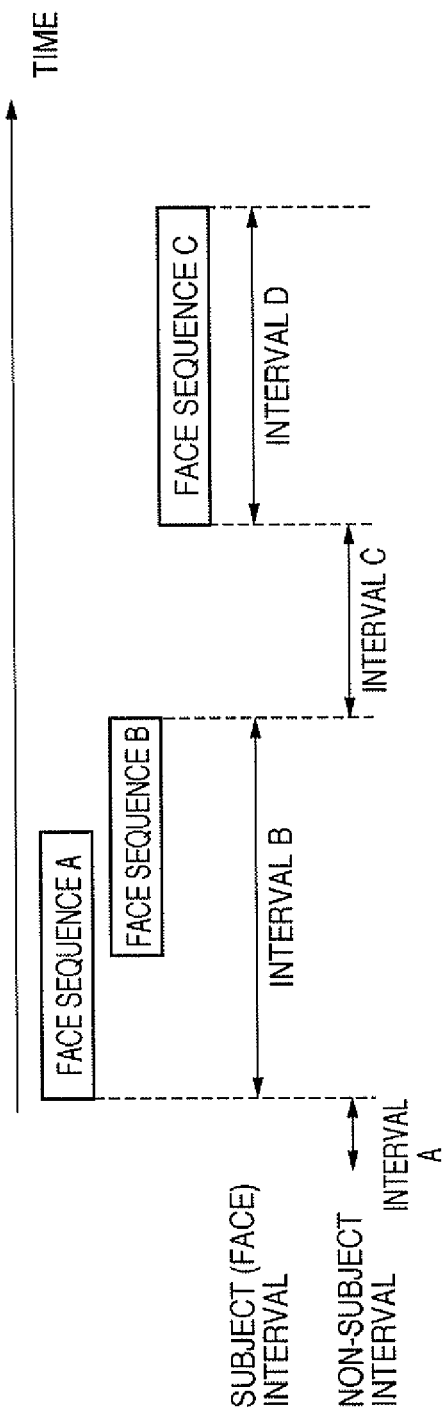
FIG. 11 is a diagram illustrating the relationship between face sequences and time intervals that are targets for extraction of a representative frame image.

FIG. 11 is a diagram illustrating the relationship between face sequences and time intervals that are targets for extraction of a representative frame image. In the range of time shown in FIG. 11, three face sequences A to C are detected and there is a time period in which face sequences A and B overlap. In the state illustrated, intervals B and D are set as subject intervals and intervals A and C are set as non-subject intervals.

The extraction method selecting unit 310 changes over the evaluation rule (extraction standard) of the representative frame image based upon the output from the face sequence generating unit 200. More specifically, with respect to a time interval within any face sequence (i.e., subject interval), a representative frame image is extracted by the subject-interval representative frame extracting unit 320. When this is not the case (i.e., with respect to a non-subject interval), a representative frame image is extracted by the non-subject-interval representative frame extracting unit 330. In other words, in the state shown in FIG. 11, the extraction method selecting unit 310 exercises control in such a manner that the moving image data with regard to intervals A and B is processed by the non-subject-interval representative frame extracting unit 330. On the other hand, the extraction method selecting unit 310 exercises control in such a manner that the moving image data with regard to intervals B and D is processed by the subject-interval representative frame extracting unit 320.

Representative Frame Extraction from Subject Interval (S600)

The subject-interval representative frame extracting unit 320, which extracts any number of representative frames adopting as the target a series of time intervals that include face sequences, is constituted by a main-face determination unit 321, a face-state determination unit 322 and a subject-interval representative frame determination unit 323.

The main-face determination unit 321 obtains an evaluation value from the standpoint of whether a subject is the main subject intended by the photographer. For example, in an interval composed of a single face sequence, the main-face determination unit 321 calculates an evaluation value of the main face from a motion pattern and appearance time, or the like, within the frame of a face generated because the photographer is operating the camera so as to place the face within the frame. A specific example of a calculation method will be described below. In the description that follows, the evaluation calculation formula is such that the more suitable a frame image is as a representative frame image, the larger the evaluation value.

Figure 10:
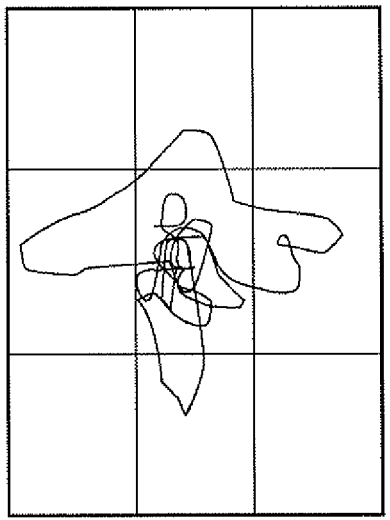
FIG. 10 is a diagram which is a plot of the path of the center of a face in a frame image that has been divided into grid-like blocks.

FIG. 10 is a plot of the path of the center of a face in a frame image that has been divided into grid-like blocks. A motion pattern within the frame of a face image is derived by obtaining the path of the central portion of the face (the face center) and adopting, as inputs, the sum total of times situated in each block of FIG. 10 and, when the face center moves outside a block, the number of times this happens on a per-direction basis. An evaluation value is calculated by thus preparing a number of motion patterns and obtaining the weighting and threshold value of a neural network using whether or not a face is the main face as learning data.

It should be noted that main-subject evaluation is performed with regard to each face sequence in an interval composed of a plurality of face sequences. Thereafter, a face sequence for which the relative evaluation value is lower than a prescribed threshold value is excluded as a target and the relative distance between the photographer and the subject is estimated from the relative size of the face and ground location, or the like. In a case where overlap in terms of time is long, it will suffice if the evaluation value of the overlap interval is made relatively high.

With regard to a subject for which the evaluation value is high in the main-face determination unit 321, the face-state determination unit 322 calculates an evaluation value indicating whether or not the face image is a face image that well represents the subject. For example, the face-state determination unit 322 derives an evaluation value taking note of face orientation, open/closed state of the eyes, facial expression, shadows due to illumination and whether part of the face is hidden by another object. With regard to face orientation and facial expression, orientation and expression learning data is applied to a face image pattern and implementation is possible by obtaining the weighting and threshold value of the neural network.

In order to determine the state of a face accurately, the existence of parts of the face such as the eyes, mouth and nose in a face image is considered important. That is, the fact that a face is facing forward is better for expressing the features of the face more accurately in comparison with a case where the face is facing sideways or is tilted. Accordingly, the face-state determination unit 322 is adapted to detect the face orientation of each face image in a face sequence. For example, the face-state determination unit 322 has a plurality of face discriminators having the same structure as that of the face discriminator based upon the above-described neural network. However, parameters for discrimination in each face discriminator are tuned and set by sample learning for every face orientation. The face orientation corresponding to the face discriminator having the highest output, that is, the face discriminator for which the likelihood is highest, from among the plurality of face discriminators is output and the evaluation that is high in a case where the face is facing forward is applied.

Further, by way of example, it may be arranged so that parts such as the eyes, mouth and nose are searched for individually from a face image and whether or not each exists is output as a result of the analysis. Further, it may be arranged so that whether eyes are open or closed is determined and output as a result of the analysis. Further, in a case where the state of illumination of a face is good and the skin portion has been captured brightly overall, an evaluation value that is higher than in a case where the face is in partial shadow is applied. With regard to shadow or concealment, a face pattern can be modeled by a method referred to as "Eigenface" as in Reference Document 3 and an approximate difference between a face image approximated by model parameters and the face image of the original image can be evaluated to thereby obtain a shadow or concealed region. Since some of the model parameters include an illumination component of the face, the direction and intensity of illumination can be found from the intensity of this component.

Reference Document 3: M. Turk and A. Pentland, "Eigenfaces for recognition", Journal of Cognitive Neuroscience 3(1): 71-86, 1991 The subject-interval representative frame determination unit 323 extracts a representative frame image from moving image data of a time interval that contains one or more face sequences. For example, the subject-interval representative frame determination unit 323 extracts a frame image for which a main-face determination has been made by the main-face determination unit 321 and for which the evaluation value that is output by the face-state determination unit 322 and the length of the moving image interval that has been input exceed prescribed threshold values. In a case where one representative frame image is extracted, the frame image having the largest evaluation values is extracted. In a case where a plurality of representative frames are output, the local maxima and moving image interval are divided and a frame for which a maximum is obtained in each divided interval is output.

Further, the spacing between representative frames or the correlation between mutually adjacent frames and the overall image may be obtained and an adjustment may be made such that the evaluation value rises at a location where motion is not sudden. It is not always necessary to select a representative frame in a case where the length of an interval is shorter than a prescribed value or in a case where an evaluation value does not satisfy a prescribed value. It should be noted that in the case of an evaluation formula where the more suitable a frame image is as a representative frame image, the smaller the evaluation value, the frame image of the minimum evaluation value is selected.

Representative Frame Extraction from Non-Subject Interval (S700)

The non-subject-interval representative frame extracting unit 330 is constituted by a scenery determination unit 331, a point-of-interest determination unit 332 and a non-subject-interval representative frame determination unit 333.

The scenery determination unit 331 applies a high evaluation value with respect to a frame in which there is a good possibility that scenery has been captured. For example, if panning is performed for more than a prescribed length of time, there is a very high probability that scenery that is characteristic of the shooting location is being captured. Further, in a case where zoom information (optical zoom or digital zoom) can be utilized, there is a very high probability that scenery is being captured more on the wide-angle side than on the telephoto side. A high evaluation value, therefore, is output.

More specifically, detection of panning is determined from the tendency of a motion spectrum distribution as by an optical flow from a frame image. In a case where there is a change in the vicinity of the center with respect to the flow of a scenery motion vector at this time, there is a high probability that some subject is being captured. A high evaluation value is not applied in such case. A specific example of subject determination using a motion vector will now be described.

First, a motion vector is found by an optical flow at each point in a frame image. Next, whether panning is in progress is determined using a motion vector at a point near the periphery of the frame. Stable detection is possible by calculating a running average in the time direction. If panning is not being performed, it cannot be determined from the motion vector whether the photographer is shooting scenery and therefore detection of a subject area is not carried out. In a case where panning is being performed, a motion vector in the vicinity of the center is found by linear interpolation using a motion vector at a point near the frame periphery.

Next, the difference between the motion vector found by linear interpolation and the motion vector obtained by the optical flow at each point in the vicinity of the center is found and an envelope area of a point where the difference vector has a length greater than a prescribed threshold value is determined to be the region of a subject. At this time a running average along the time direction is found using the area of the subject and, in a case where a prescribed area is occupied, it is determined that a subject is being captured.

The point-of-interest determination unit 332 applies a high evaluation value in a case where an object that generally leaves an impression is being captured, although the object is not a target of recognition. In a case where extensive panning is being performed, there is a method based upon subject determination using the motion vector described in connection with the scenery determination unit 331. In this case, an evaluation value is output based upon area. A specific example in a case where panning is not performed will be described below.

First, the image is split into a plurality of regions based upon the difference between mutually adjacent frames, and a high evaluation value is output with respect to a region that has a high probability of being a point of interest. For example, features such as the position, edge, saturation, hue distribution and motion pattern, or the like, of each region are learned as learning data by the above-described neural network, and a high evaluation value is output in a case where there is a high probability that the region is a point of interest. Further, in a case where zoom information at the time of shooting can be utilized, it will suffice to output an evaluation value that is higher on the wide-angle side than on the telephoto side.

The non-subject-interval representative frame determination unit 333 extracts a representative frame image from moving image data of a time interval that contains no face sequence. For example, the non-subject-interval representative frame determination unit 333 extracts a frame image for which the evaluation value that is output by the scenery determination unit 331 and the length of the moving image interval that has been input exceed prescribed threshold values. In a case where one representative frame image is extracted, the frame image having the largest evaluation values is extracted.

It should be noted that with an evaluation value in an interval in which it is higher than a prescribed threshold value, representative frame images may be successively added on and output whenever a value obtained by integrating a motion vector in terms of time exceeds the prescribed threshold value. In this way the overall scenery can be output as representative frame images.

Furthermore, the non-subject-interval representative frame determination unit 333 extracts a frame image for which the evaluation value that is output by the point-of-interest determination unit 332 and the length of the input moving image interval exceed prescribed values. In a case where one representative frame image is extracted, the frame image having the largest evaluation values is extracted.

In a case where a plurality of representative frames are output, the local maxima and moving image interval are split and a frame for which a maximum is obtained in each split interval is output. Further, the spacing between representative frames or the correlation between mutually adjacent frames and the overall image is obtained and an adjustment may be made such that the evaluation value rises at a location where motion is not sudden. It is not always necessary to select a representative frame in a case where the length of an interval is shorter than a prescribed value or in a case where an evaluation value does not satisfy a prescribed value. Further, it may be arranged so that only an evaluation value obtained from either the scenery determination unit 331 or the point-of-interest determination unit 332 is used.

FIG. 6 is a diagram illustrating an example of data obtained by outputting position information of representative frame images. The first column is a column of numbers of seconds from the beginning of the moving image; the second column is a column of sequence numbers as indicated in FIG. 5; and a third column is a column of evaluation values. Absence of a sequence number in the second column indicates a representative frame that has been that has been extracted from a non-subject interval. Midway results leading up to a final evaluation may be additionally written as evaluation values set forth in the third column. For example, if an interval is a non-subject interval, writing in the evaluation value from the scenery determination unit 331 and the evaluation value from the face-state determination unit 322 makes it possible to narrow down representative frame images to the representative frame image desired by the user.

Only one representative frame image or a plurality thereof may be stored with respect to one time interval. Further, it may be arranged so that a representative frame is not stored as in a case where there is no frame image having an evaluation value that exceeds a prescribed threshold value with regard to a certain time interval, as described above.

It should be noted that in a case where a list display is the objective, a small number of representative frame images is desirable. In a case where index information used in a search is the objective, it is better to have a large number of representative frame images. Since the number of representative frame images required differs depending upon the objective, evaluation values may be stored together in a storage unit beforehand and, by leaving the number of representative frame images designated by the user, the required number of representative frames can be selected in order of decreasing evaluation value.

Further, this embodiment can be combined with the technology disclosed in Patent Document 1, by way of example. That is, a representative frame extracted by the method according to this embodiment can be used as a key frame and it is possible to further narrow down and present representative frames based upon similarity, or the like.

Further, the data format used when data is stored in a storage unit can be any data format as long as analysis by the system is possible. For example, expression may be made in a text format or in an XML (Extensible Markup Language) format that defines its own DTD (Document Type Definition).

Figure 13:
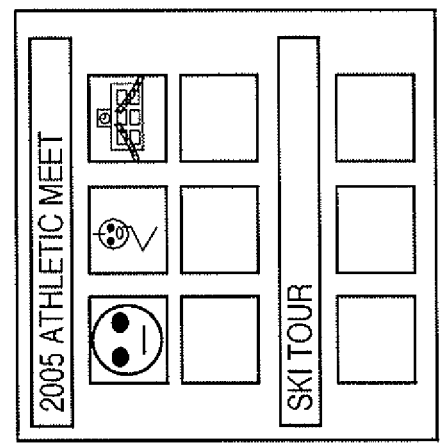
FIG. 13 is a diagram illustrating an example of output of a list of representative frame images.

FIG. 13 is a diagram illustrating an example of output of a list of representative frame images. It may be arranged so that the list of extracted representative frame images is displayed on the monitor 1008, or it may be arranged so that the list is printed out by the printer 1009.

In accordance with the information processing apparatus according to the first embodiment described above, representative frame images can be extracted from moving image data with regard to a time interval that includes a face sequence and a time interval that does not include a face sequence. As a result, a frame image of scenery, for example, is extracted from the time interval that does not include a face sequence. By thus extracting a frame image as a representative frame image, the user can directly ascertain "where" moving image data was captured.

Further, it may be arranged so that rather than performing representative frame extraction for every face sequence, extraction of a representative frame image is performed by focusing on moving image data in a time interval in which a face sequence has been generated. By adopting this arrangement, in which one person among a plurality of persons is the main person can be evaluated and representative frame extraction based upon this evaluation can be carried out.

(Modification)

In the first embodiment, the face of a person is detected as a subject pattern and a face sequence is generated. However, if the target of image capture can be grasped, then another object may be treated as the subject pattern.

For example, in a case where a moving train is shot from the ground near the railway, the train is detected and tracked and it will suffice to change the rule for extracting a representative frame depending upon whether or not the interval is one in which the train has been captured. It should be noted that in order to extract a representative frame from the train-captured interval, an ideal arrangement is to append a high evaluation value at a location where the front end of the leading car appears, based upon the level of the audio track and the panning operation.

Figure 12:
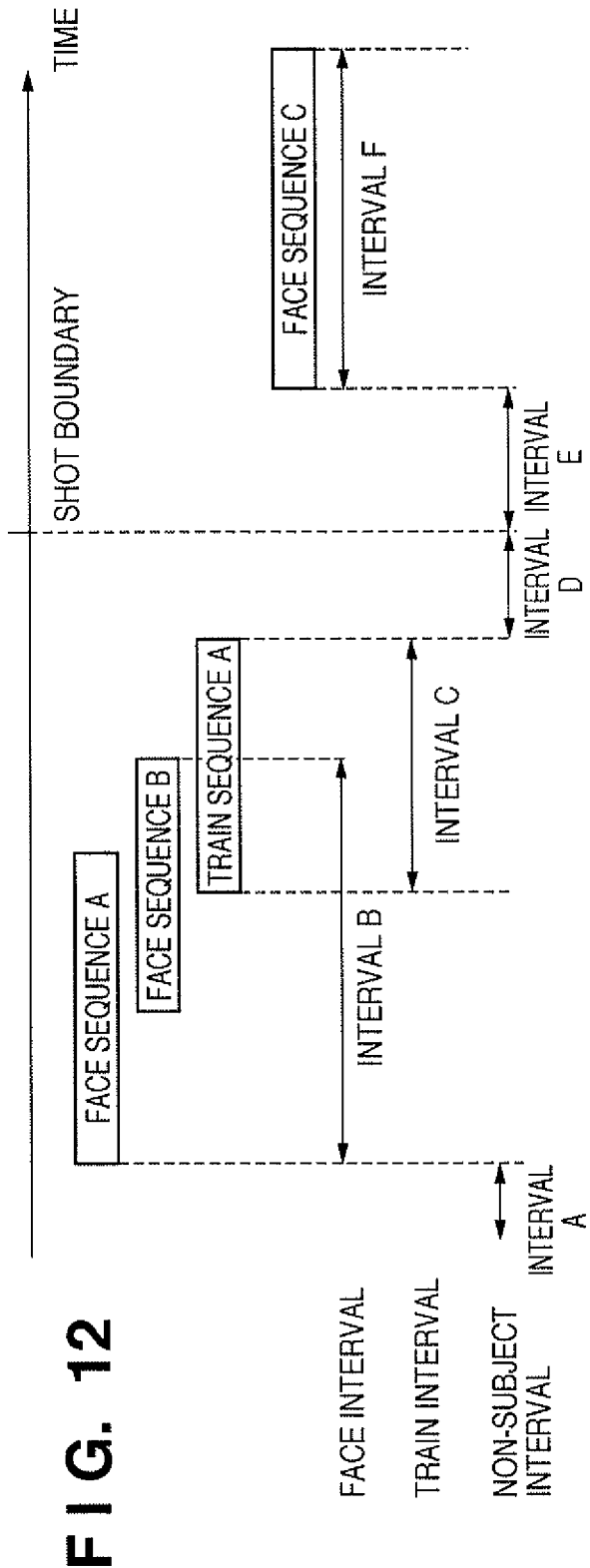
FIG. 12 is a diagram illustrating an example of extraction of a representative frame image from moving image data that includes face sequences and a train sequence.

FIG. 12 is a diagram illustrating an example of setting of intervals when a representative frame image is extracted from moving image data that includes face sequences and a train sequence. In a case where subject categories of a plurality of categories such as faces and a train are detected, as shown in FIG. 12, control is implemented so as to partition the time interval at the shot boundary.

By thus utilizing images of different types as subject categories, a more appropriate representative frame image can be extracted from the moving image data. It should be noted that categories such as "faces of family members" and "faces of people other than family members" may be used as subject categories.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g. computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-278607, filed Oct. 29, 2008, which is hereby incorporated by reference herein in its entirety.

What is claimed is:

1. An information processing apparatus comprising:
an input unit configured to input moving image data that includes a plurality of frame images arranged in a time series;
a detecting unit configured to detect a frame image, which includes an image similar to a prescribed subject pattern, from moving image data that has been input;
a tracking unit configured to detect a frame image, which includes an image similar to the image included in the frame image detected by said detecting unit, detection being performed by adopting frame images before and after the detected frame image as a target;
a storage unit configured to store, as a subject sequence, successive frame images that have been detected by said tracking unit, the successive images being stored in association with time information in the moving image data corresponding to the subject sequence;
a splitting unit configured to split the moving image data into subject intervals, each of which includes one or more subject sequences and non-subject intervals, each of which includes no subject sequences; and
a first extracting unit configured to extract, from each of the subject intervals, a first representative frame image using a first evaluation rule; and
a second extracting unit configured to extract, from each of the non-subject intervals, a second representative frame image using a second evaluation rule which is different from the first evaluation rule.

2. The apparatus according to claim 1, wherein said first extracting unit calculates, based upon the first evaluation rule, an evaluation value of each of the frame images included in each of the subject intervals, and extracts a frame image, for which the evaluation value is maximum or minimum, as the first representative frame image in the subject interval.

3. The apparatus according to claim 1, wherein said second extracting unit derives a motion vector distribution between frame images included in non-subject intervals, calculates each evaluation value of the frame images based upon the derived motion vector distribution and extracts a frame image, for which the evaluation value is maximum or minimum, as the first representative frame image in the subject interval.

4. The apparatus according to claim 1, wherein the prescribed subject pattern is a face image of a person.

5. A method of controlling an information processing apparatus for extracting one or more representative frame images from moving image data, said method comprising:
an input step of inputting moving image data that includes a plurality of frame images arranged in a time series;
a detecting step of detecting a frame image, which includes an image similar to a prescribed subject pattern, from moving image data that has been input;
a tracking step of detecting a frame image, which includes an image similar to the image included in the frame image detected at said detecting step, detection being performed adopting frame images before and after the detected frame image as a target;
a storage step of storing, as a subject sequence, successive frame images that have been detected at said tracking step, the successive images being stored in a storage unit in association with time information in the moving image data corresponding to the subject sequence;
a splitting step of splitting the moving image data into subject intervals, each of which includes one or more subject sequences and non-subject intervals, each of which includes no subject sequences; and
a first extracting step of extracting, from each of the subject intervals, a first representative frame image using a first evaluation rule; and
a second extracting step of extracting, from each of the non-subject intervals, a second representative frame image using a second evaluation rule which is different from the first evaluation rule.

6. A non-transitory computer-readable recording medium retrievably storing a computer program for causing a computer to function as each of the units of the information processing apparatus set forth in claim 1.

* * * * *